United States Patent [19]

LeCun et al.

[11] Patent Number: 5,337,372
[45] Date of Patent: Aug. 9, 1994

[54] METHOD AND APPARATUS FOR SYMBOL RECOGNITION USING MULTIDIMENSIONAL PREPROCESSING AT MULTIPLE RESOLUTIONS

[75] Inventors: Yann A. LeCun; Quen-Zong Wu, both of Lincroft, N.J.

[73] Assignee: AT&T Bell Laboratories, Murray Hill, N.J.

[21] Appl. No.: 959,895

[22] Filed: Oct. 13, 1992

[51] Int. Cl.$^5$ .................................................. G06K 9/00
[52] U.S. Cl. ........................................ 382/27; 382/37; 382/49
[58] Field of Search .................. 382/36, 37, 38, 14, 382/27, 49

[56] References Cited

U.S. PATENT DOCUMENTS

| | | | |
|---|---|---|---|
| 3,829,831 | 8/1974 | Yamamoto et al. | 382/38 |
| 4,284,975 | 8/1981 | Odaka | 340/146.3 J |
| 4,317,109 | 2/1982 | Odaka | 340/146.3 AC |
| 4,731,857 | 3/1988 | Tappert | 382/9 |
| 4,799,270 | 1/1989 | Kim et al. | 382/37 |
| 5,005,205 | 4/1991 | Ellozy et al. | 382/3 |
| 5,029,223 | 7/1991 | Fujisaki | 382/13 |
| 5,058,179 | 10/1991 | Denker et al. | 382/14 |
| 5,067,164 | 11/1991 | Denker et al. | 382/15 |
| 5,093,803 | 3/1992 | Howard et al. | 364/807 |
| 5,105,468 | 4/1992 | Guyon et al. | 382/14 |
| 5,121,441 | 6/1992 | Chefalas et al. | 382/13 |

Primary Examiner—Leo H. Boudreau
Attorney, Agent, or Firm—Christopher N. Malvone

[57] ABSTRACT

Data samples describing a plurality of micro-segments that compose a symbol to be recognized are received from a device such as an electronic pad. Preprocessors map the micro-segments into cells of a plurality of feature arrays with different resolutions. Preprocessors assign values to the cells based on the length of a micro-segment associated with the cell, and how well the features of the associated micro-segment correspond to the feature label of the cell. The cell values are used as inputs to comparators that compare the feature arrays with reference arrays. The results of comparisons involving lower resolution feature arrays and reference arrays, are used to limit the number of comparisons involving higher resolution feature arrays and reference arrays. The highest resolution comparison selects the reference array that identifies the symbol to be recognized.

21 Claims, 5 Drawing Sheets

A

B

C

METHOD AND APPARATUS FOR SYMBOL RECOGNITION USING MULTIDIMENSIONAL PREPROCESSING AT MULTIPLE RESOLUTIONS

CROSS-REFERENCE TO RELATED APPLICATION

Related subject matter is disclosed in co-pending applications Ser. No. 959,846, entitled "A Method and Apparatus for Symbol Recognition Using Multidimensional Preprocessing", and Ser. No. 959,874, entitled "A Method and Apparatus for Symbol Recognition Using Multidimensional Preprocessing and Symbol Sorting", filed concurrently herewith.

BACKGROUND OF THE INVENTION

1. Field of the Invention

The present invention relates to symbol recognition, more particularly, it relates to symbol recognition using multidimensional preprocessing at multiple resolutions.

2. Description of the Prior Art

Character recognition systems suffer from two problems. In an effort to limit the number of cells in an array that describes a character, a quantization error is introduced, and even with a limited number of cells, a large amount of computational time is still required to identify the character.

Some character recognition systems use a pixel array to describe a character. For example, U.S. Pat. No. 5,067,164 describes a system that uses a pixel array. Since a character comprises many pixels, a pixel array produces a large number of cells. This problem is compounded when an array with several dimensions is used to include additional information describing the character. As a result, it is necessary to map several pixels into a single cell of the array, where each cell encompasses a given volume. This reduces the number of cells and thereby reduces the number of computations required to compare the pixel array with a reference array. Unfortunately, by mapping several pixels into a cell, a quantization error is introduced. This can result in a character recognition system that has unacceptable error rates.

Other character recognition systems represent a character using a feature vector or feature array that describes the character. In order to provide a description with sufficient information, many cells are included in the array. The feature array is then compared against a set of reference feature arrays to determine the identity of the character in question. This technique requires a comparison between a feature array with many cells, and a large selection of reference arrays, where each reference array has many cells. This comparison requires a large amount of computational time, and is therefore unacceptable in many applications.

SUMMARY OF THE INVENTION

The present invention addresses the above described problems by providing a symbol recognition system that compensates for quantization error and reduces the amount of computation time required to identify a symbol.

The present invention compensates for quantization error by using a cellular array with multiple dimensions or multiple two-dimensional cellular arrays to quantify the features of a plurality of small line segments, or micro-segments, that compose a symbol. Each dimension represents a different feature such as x position, y position, trajectory angle, time, pen speed, pen acceleration, line start points, line endpoints, curvature, stroke index, pen-up/down and other features. In accordance with the principles of this invention, the value of each cell in the array is set to indicate how well a micro-segment associated with that cell matches the feature label of that cell, where a feature label indicates a cell's position in the array. As a result, small changes in the shape of a symbol produce relatively small changes in the value of a cell and thereby compensate for the quantization error.

The present invention reduces the computational time required to identify a character by using a plurality of cellular feature arrays to select subsets of reference arrays from a large collection of reference arrays. A low resolution feature array is compared to a group of low resolution reference arrays to identify a subset of reference arrays that are similar to the feature array. This subset is used to select medium resolution reference arrays that are compared to a medium resolution feature array. This comparison produces another subset which is used to select high resolution reference arrays that are compared to a high resolution feature array to identify the symbol. The computational time that is required to identify the symbol is reduced by decreasing the number of reference arrays involved in the comparison as the number of cells in the arrays increases. (The increasing number of cells in the arrays corresponds to an increase in resolution.)

One embodiment of the present invention provides means responsive to an applied plurality of micro-segments which describes a symbol, for associating a micro-segment with a plurality of cells, where each of the cells has an associated feature label. This embodiment also provides means for assigning a cell value to a cell, using a micro-segment value that is related to how well a feature of the micro-segment associated with the cell corresponds to the cell's feature label, and it provides means for selecting a subset of reference arrays from a plurality of reference arrays based on a similarity between the plurality of cells and a reference array in the plurality of reference arrays. Additionally, means are provided for means for associating the micro-segment with a new plurality of cells where each of the cells has an associated feature label, and means are also provided for recognizing the symbol based on a similarity between the new plurality of cells and a new reference array in a new plurality of reference arrays identified by the subset of reference arrays.

Another embodiment of the present invention comprises means for assigning a cell value to a cell using a micro-segment value that is related to the length of the micro-segment associated with the cell.

Yet another embodiment of the present invention comprises means for decreasing the number of low resolution reference arrays compared with the low resolution feature array by perforating an initial examination of the symbol's features.

DETAILED DESCRIPTION

Figure 1:
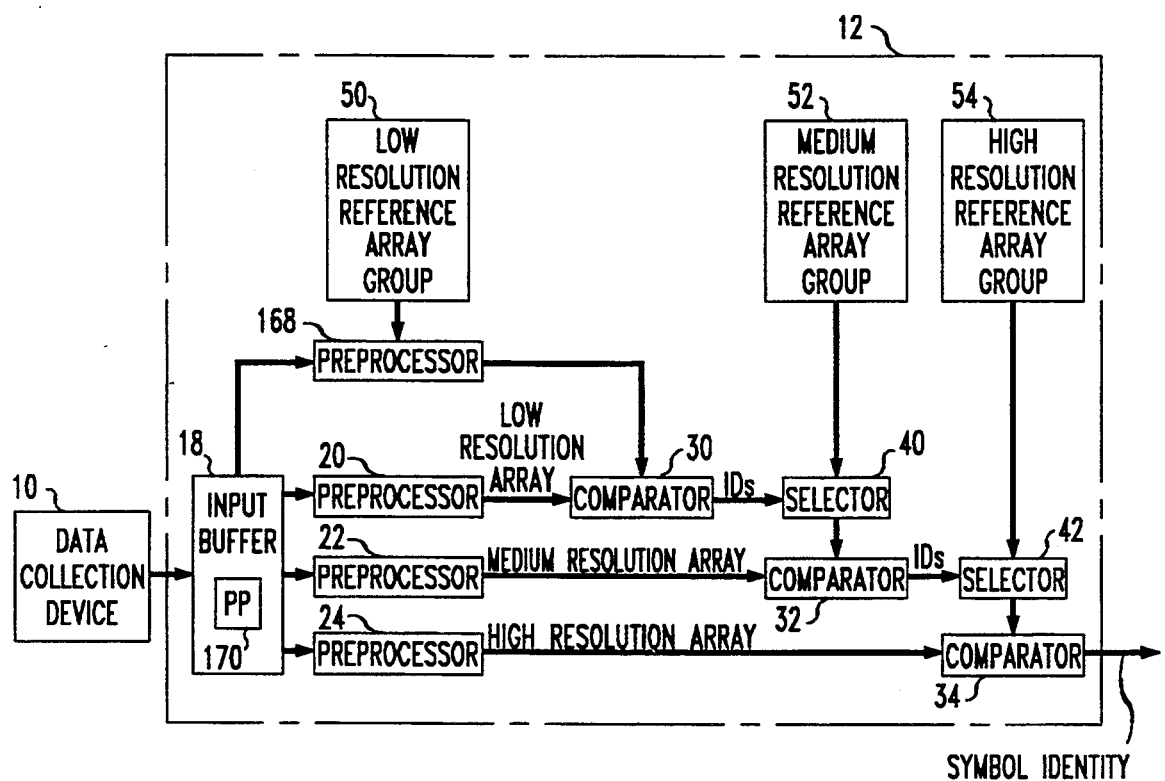
FIG. 1 illustrates a symbol recognition system.

FIG. 1 illustrates a symbol recognition system. Data collection device 10 provides data that describes the symbol to processor 12. Processor 12 maps the symbol into several cellular feature arrays, assigns values to the cells that compose the feature arrays and compares the feature arrays against cellular reference arrays. The cellular reference array that most closely matches the highest resolution cellular feature array is identified as corresponding to the character to be recognized.

Data collection device 10 may be implemented using a pad with an electronic pen, a terminal with a touch sensitive screen, an optical character reader, a device that scans symbols using an electromagnetic wave, a camera, or any other type of device, data source or communication link that provides data describing the symbol to be identified. In the case of an optical character reader, it may be necessary to skeletonize the symbol at some point in the preprocessing. Data collection device 10 may be a GRiDPAD from GRiD Systems Corporation, a Toshiba Pen PC from Toshiba America Information Systems, Inc., or another apparatus that collects data describing a symbol to be identified.

Processor 12 comprises input buffer 18, preprocessors 20, 22 and 24, comparators 30, 32 and 34, selectors 40 and 42, and reference array groups 50, 52 and 54.

Input buffer 18 receives the data describing the symbol from data collection device 10 and stores that data for use by preprocessors 20, 22 and 24. Input buffer 18 can be constructed using a random access memory (RAM), a first-in-first-out (FIFO), memory registers, optical disks, or any other memory device. Preprocessors 20, 22 and 24 map the input symbol into cellular feature arrays of low, medium and high resolution, respectively. The low, medium and high resolution cellular feature arrays are used as inputs to comparators 30, 32 and 34 respectively. Each of the comparators is used to compare a cellular feature array with a set of cellular reference arrays.

Reference array group 50 comprises one low resolution cellular reference array for each symbol to be recognized. Reference array group 52 comprises one medium resolution cellular reference array for each symbol to be recognized. Reference array group 54 comprises one high resolution cellular array reference for each symbol to be recognized. It is also possible for each of the array groups to have more than one reference array for each symbol to be recognized. Each reference array in each of groups 50, 52 and 54 has an associated identification label which is used to select the reference array for use by a comparator.

Comparator 30 compares the low resolution cellular feature array with the low resolution reference cellular arrays in group 50 to identify a subset of low resolution reference cellular arrays from group 50. The reference arrays that are most similar to the feature array are included in the subset. The subset of low resolution reference arrays corresponds to a set of candidate symbols that may be identified as the symbol to be recognized. Identification tags associated with the arrays in the subset are fed to selector 40. Selector 40 uses the identification tags to select the medium resolution reference arrays from reference group 52 that correspond to the candidate symbols. The cellular reference arrays selected by selector 40 are provided to comparator 32, which compares the medium resolution feature array from preprocessor 22 with the medium resolution reference arrays provided by selector 40. Comparator 32 identifies a subset of medium resolution cellular reference arrays provided by selector 40 that most closely match the cellular feature array from preprocessor 22. The subset of medium resolution reference arrays corresponds to a new, smaller subset of candidate symbols that may be identified as the symbol to be recognized. Identification tags associated with the arrays composing the new subset are fed to selector 42. Selector 42 uses the identification tags to select the high resolution reference arrays from reference group 54 that correspond to the candidate symbols. The cellular reference arrays selected by selector 42 are provided to comparator 34 which compares the high resolution reference array from preprocessor 24 with the high resolution reference arrays provided by selector 42. Comparator 34 identifies the high resolution cellular reference array provided by selector 42 that most closely matches the high resolution feature cellular array from preprocessor 24. The identified high resolution reference array corresponds to a symbol which identifies the symbol to be recognized.

Additional stages can be used if the set of symbols to be identified is large or complex, and less stages can be used if the set of symbols is small or less complex. Each stage should produce a new subset which is smaller than the previous subset. The new and smaller subset should be used to perform a higher resolution comparison between the character to be identified and the remaining reference patterns through the use of a higher resolution feature array and higher resolution reference arrays.

The above discussed preprocessors, comparators and selectors can be implemented in hardware and/or software. Hardware such as microprocessors, computers, specialized hardware, microcomputers, PCs or mainframes may be used to implement any one or all of these functions. Reference array groups 50, 52 and 54 can be stored in any convenient memory such as a RAM, read-only-memory (ROM), magnetic disk, optical disk or bubble memory or they may be calculated on the fly. It is also possible to implement all of the above functions in software on a single computer or a plurality of computers. For example, the above described functions can be implemented on a Sun workstation or an AT&T 6386 PC.

Preprocessors 20, 22 and 24 receive data describing the symbol in question from data device 10. This data can be in a variety of forms; however, it typically is in the form x(t) which describes horizontal position, and y(t) which describes vertical position. Data received in the form x(t) and y(t) enables preprocessors to determine the size of the symbol, the pen speed and/or acceleration, line trajectories and a variety of other features. Techniques for determining features using x(t) and y(t) are known in the art, and are disclosed in U.S. Pat. No. 5,105,468 entitled "TIME DELAY NEURAL NETWORK FOR PRINTED AND RECURSIVE

HANDWRITTEN CHARACTER RECOGNITION".

As an initial step in preprocessing, the preprocessors normalize the size of the received symbol by increasing or decreasing the overall size of the symbol to a standard size (typically a standard height) while maintaining the aspect ratio of the symbol. Techniques for normalizing a symbol are known in the art and are disclosed in the above-referenced U.S. Pat. No. 5,105,468. Additionally, each line or curve composing the symbol is broken into micro-segments based, for example, on the sample period of data collection device 10, where each sample represents an endpoint of a micro-segment. It is possible to base the micro-segments on any convenient sampling period by simply resampling the data provided by data collection device 10.

The micro-segments that make up the symbol are mapped into cells that compose a feature array which quantifies the features of the micro-segments. Each cell is assigned a value that is used by the comparators.

Figure 2:
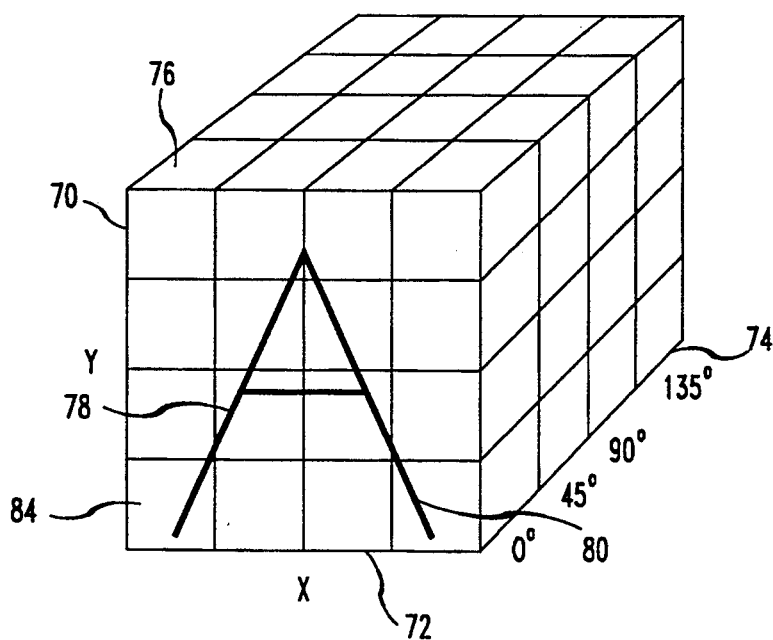
FIG. 2 illustrates a three-dimensional cellular array that quantifies the features of a micro-segment.

FIG. 2 illustrates a three-dimensional array that quantifies the features of the micro-segments. Note that the array is drawn as three dimensional for ease of visualization, and that the array can be implemented as a collection of locations in a memory. Axis 70 indicates the y position of a micro-segment, axis 72 indicates the x position of a micro-segment and axis 74 indicates the direction of the trajectory of a micro-segment. The three-dimensional array comprises sixty-four cells 76. In this example, axis 70 has been quantized into four cells that cover the y dimension of the symbol. Axis 72 has been quantized into four cells that cover the x dimension of the symbol. Axis 74 has been quantized into four cells that cover the possible trajectories for the micro-segments, that is, trajectories along a 0°/180° line, a 45°/225° line, a 90°/270° line and a 135°/315° line. Each micro-segment composing a symbol is mapped into or associated with the cell that has a feature label which most closely matches the features of the micro-segment. In the illustration, the entire symbol "A" is shown in the 0° cellular plane for clarity. It should be understood that leg 78 should be in the 45° cellular plane and leg 80 should be in the 135° cellular plane.

Other three-dimensional arrays may be used. Each axis can be assigned to any micro-segment feature and each dimension can be quantized into any number of cells. For example, it is possible to use a three-dimensional array comprising a first axis with six cells that indicate a micro-segment's x position, a second axis with six cells that indicate a micro-segment's y position, and a third axis with four cells that indicate a micro-segment's trajectory direction.

It is also possible to map or associate a micro-segment with more than one cell. For example, if axis 74 was defined as the cosine of the angle between the micro-segment's trajectory and the trajectory lines listed along axis 74, the entire symbol "A" would be in each of the cellular planes along axis 74.

A three-dimensional array was used as an example; however, an array can be constructed using any number of dimensions. For example, a five-dimensional array can be used by assigning an axis to the micro-segment's x position, y position, trajectory, curvature and pen speed.

In some situations, there may be correlations between the features of a sequence of micro-segments. In the case of handwritten words, the time and x coordinate typically increase simultaneously. This results in an inefficient use of cells because only the cells which are near a diagonal in the array's x-t plane are populated. This problem is avoided by transforming the coordinate system so that the correlations between the features of the sequence of micro-segments are minimized. This is accomplished using known techniques such as a principal axis transform (also known as a Karhunen-Loeve transform) or Kohonen's topological map algorithm to distribute the micro-segments within the array. The Kohonen algorithm is described in Kohonen, T. "Self-Organized Formation of Topologically Correct Feature Maps," *Biological Cybernetics*, Vol. 43, pages 59-69, 1982.

Figure 3:
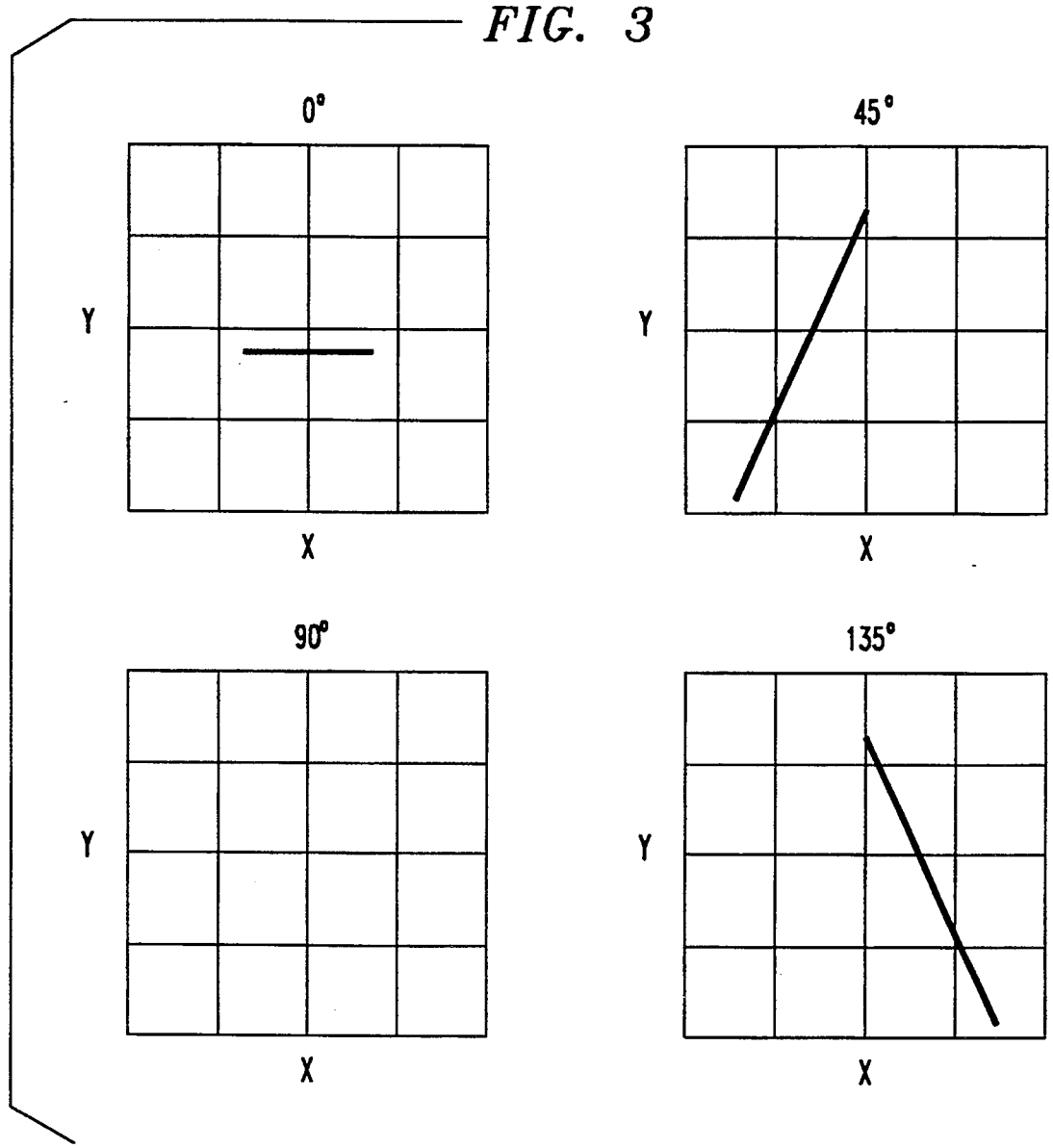
FIG. 3 illustrates the three-dimensional array of FIG. 2 represented as four 4×4 cellular array planes.

FIG. 3 illustrates the array of FIG. 2 in a different format. This format consists of four two-dimensional cellular gays, where each of the four planar arrays correspond to a different trajectory from axis 74 of FIG. 2. Each planar array has a y and x axis that describes the position of the micro-segments. In this example, each planar array contains 16 cells so that a total of 64 cells form the cellular feature array used by a comparator.

Figure 4:
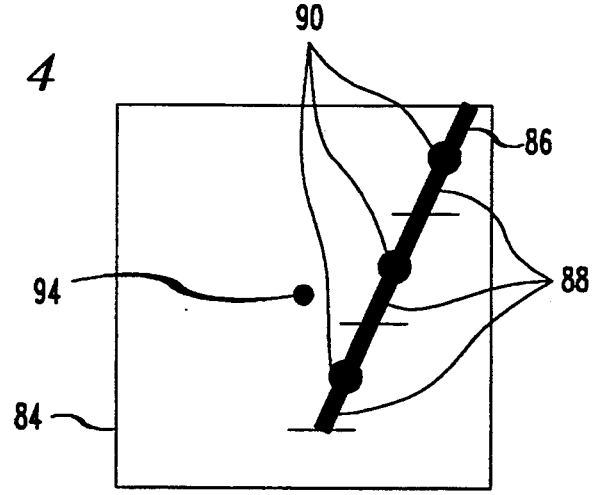
FIG. 4 illustrates one cell of the array in FIG. 2.

FIG. 4 is an enlarged view of cell 84 of FIG. 2. Line 86 is the portion of the symbol "A" that is contained in cell 84. Line 86 comprises micro-segments 88, with each micro-segment having a center point 90. The horizontal lines on line 86 indicate the boundaries between micro-segments. The feature label or center of cell 84 is represented by point 94. The value assigned to cell 84, which is provided to the comparators, is based on how closely each micro-segment in cell 84 corresponds to the center of cell 84, and on the length and number of micro-segments in cell 84.

In determining the value of a cell, a value should be assigned to each micro-segment associated with the cell. The value of a micro-segment is determined by the micro-segment's distance from the center of the cell. This distance is measured from the center point of the cell to the center point of the micro-segment. The further that the center of the micro-segment is from the center of the cell, the lower the value that is assigned to that micro-segment. (It is also possible to assign higher values, but it is more convenient to use lower values). This decrease in value can be a linear function or any other convenient function. For example, in assigning a value to a micro-segment based on its two-dimensional distance from a center point of a cell, a two-dimensional Gaussian function can be used. It is also possible to use trigonometric functions. For example, cell 94's center for the trajectory dimension is represented by the 0°/180° line. The value of a micro-segment can be decreased based on the cosine of the angle between the 0°/180° line and the actual direction of the trajectory of the micro-segment. A multitude of other functions such as bell-shape functions, Mexican hat functions, difference of Gaussians or a spline may also be used.

A micro-segment's distance from the center of the cell can be treated separately for each dimension. For example, a Gaussian decrease in value can be used for the x direction, a linear decrease in value can be used for the y direction and a cosine reduction in value can be used for the trajectory dimension.

It is also possible to decrease the value of a micro-segment using a single multi-dimensional function such as a multi-dimensional Gaussian.

If separate functions are used to decrease a micro-segment's value, the reductions in value obtained for each dimension can be combined using a summation, product or other functions.

A value assigned to a micro-segment may be modified using a factor based on the length of the micro-segment. For example, longer micro-segments may be given more weight than shorter micro-segments.

The value of the cell, which is provided to a comparator, is obtained by summing the values assigned to the micro-segments mapped into the cell. For example, in a situation where a micro-segment's x-y value is determined with a two-dimensional Gaussian function of the micro-segment's x-y distance from the cell's x-y center ($\Delta x, \Delta y$), and where a micro-segment's trajectory angle value is determined with a cosine function of the angle between the micro-segment's trajectory and the cell's trajectory center ($\Delta \Theta$), the cell value C can be expressed by the following equation where the summation is performed over the N micro-segments within the cell and where the factor $L_i$ is based on the length of micro-segment i.

$$C = \sum_{i=1}^{N} (\cos(\Delta\Theta)\text{Gaussian}(\Delta x, \Delta y)L_i)_i.$$

Figure 5:
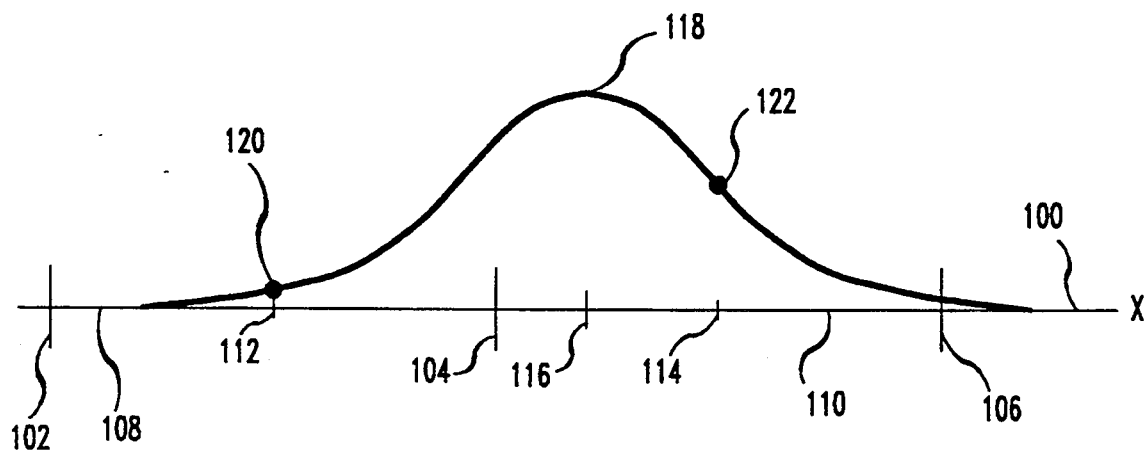
FIG. 5 illustrates a spreading function used in the x dimension.

The value of a cell may also be affected by micro-segments in other cells. FIG. 5 illustrates a spreading function which affects the value of cells based on a micro-segment that is contained in another cell. In this example, a micro-segment's position in the x dimension is used to determine the value of the cell in which the micro-segment is contained and the value of an adjacent cell. Axis 100 indicates the x dimension, and positions 102, 104 and 106 indicate the boundaries between adjacent cells in the x dimension. Cell 108 is bounded by the values of x at positions 102 and 104, and cell 110 is bounded by the values of x at positions 104 and 106. The x dimension center for cell 108 is indicated by position 112 and the x dimension center for cell 110 is indicated by position 114. Cell 110 contains a micro-segment that has its x dimension center at position 116. A spreading function indicated by curve 118 is used to assign values to the micro-segment in cell 110. in this example, the micro-segment in cell 110 is assigned two values. The first value is used in determining the value of cell 108 and the second value is used in determining the value of cell 110. The first value of the micro-segment is based on the distance between positions 116 and 112. Point 120 on curve 118 indicates the first value that the spreading function assigns to the micro-segment. The second value of the micro-segment is based on the distance between positions 116 and 114. Point 122 on curve 118 indicates the second value that the spreading function assigns to the micro-segment. The first value which corresponds to point 120 on curve 118 is used in determining the value of cell 108, and the second value which corresponds to point 122 on curve 118 is used in determining the value of cell 110.

Other spreading functions may be used such as a spreading function that affects more than two cells, or spreading functions that assign negative values to micro-segments.

Figure 6:
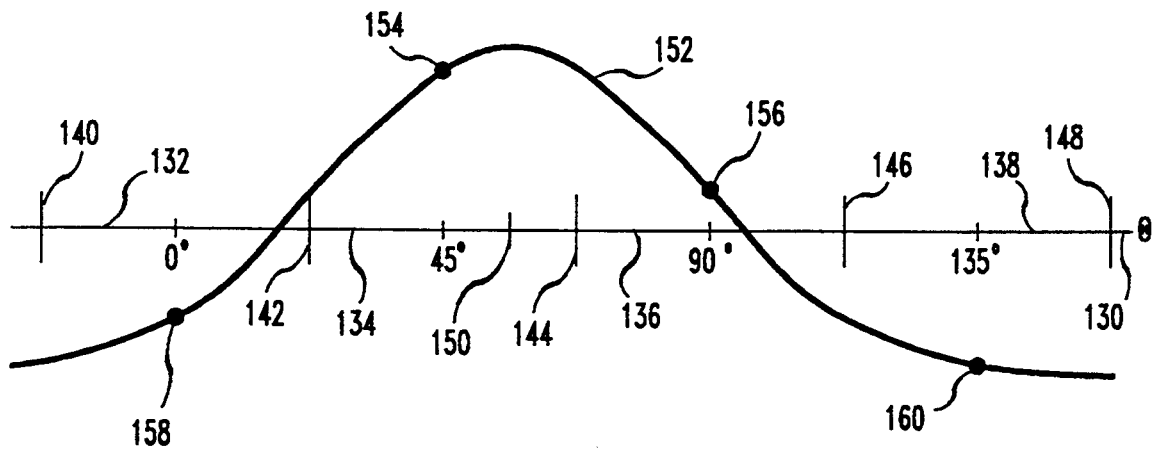
FIG. 6 illustrates a spreading function used in the Θ dimension.

FIG. 6 illustrates a spreading function that assigns both positive and negative values to a micro-segment. Axis 130 indicates the trajectory angle $\Theta$ of a micro-segment. The $\Theta$ dimension is broken into cells 132, 134, 136 and 138. Cell 132 has a $\Theta$ dimension center of 0 degrees and its boundaries are indicated by positions 140 and 142. Cell 134 has a $\Theta$ dimension center of 45 degrees and its boundaries are indicated by positions 142 and 144. Cell 136 has a $\Theta$ dimension center of 90 degrees and its boundaries are indicated by positions 144 and 146. Cell 138 has a $\Theta$ dimension center of 135 degrees and its boundaries are indicated by positions 146 and 148. A micro-segment in cell 134 has a trajectory along the 55 degree trajectory and is indicated by position 150. This micro-segment is used in determining the value of cells 132, 134, 136 and 138 even though the micro-segment is only located in cell 134. A spreading function indicated by curve 152 is used to assign values to the micro-segment based on the $\Theta$ dimension distances between the micro-segment and the center of cells 132, 134, 136 and 138. These assigned values are used in determining the values of the cells. Point 154 on curve 152 assigns the micro-segment a value that is used in determining the value of cell 134. Point 156 on curve 152 assigns the micro-segment a value that is used in determining the value of cell 136. Point 158 on curve 152 assigns the micro-segment a negative value that is used in determining the value of cell 132. Point 160 on curve 152 assigns the micro-segment a negative value that is used in determining the value of cell 138.

Any variety of spreading functions can be used to assign values to the micro-segments. The spreading functions can be limited to assigning a single value to a micro-segment that acts within one or more cells, or they may assign a plurality of values that act within one or more cells. These values may be negative or positive and can be defined using functions such as Gaussian functions, trigonometric functions, bell-shape functions, Mexican hat functions, difference of Gaussians or a spline.

It is also possible to map the micro-segments into cells based on the endpoints of the micro-segments. In some cases this may result in one micro-segment being mapped into more than one cell. In either case, it is possible to use spreading functions based on the endpoint of the micro-segment.

Figure 7:
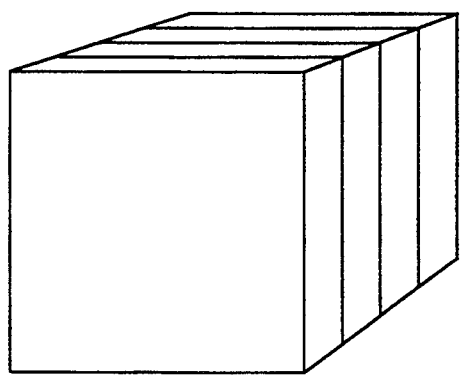
FIGS. 7a, b and c illustrate a low resolution cellular feature array.
Figure 7:
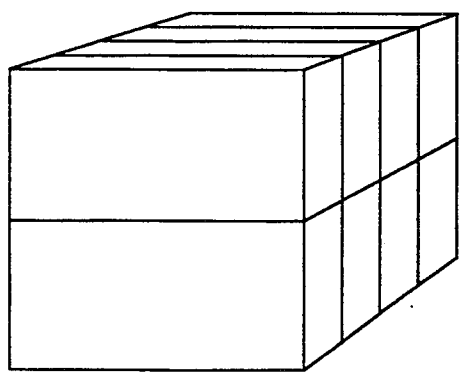
Figure 7:
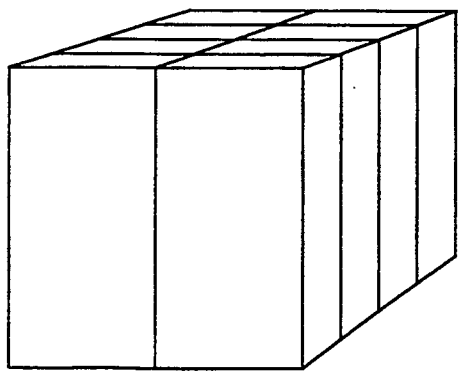

The combination of FIGS. 7a, b and c illustrate the low resolution cellular feature array produced by preprocessor 20. FIG. 7a illustrates a $1 \times 1 \times 4$ cellular array. The x and y dimensions are quantized into one cell and the trajectory direction is quantized into four cells. FIG. 7b illustrates a $1 \times 2 \times 4$ cellular array. The x dimension has been quantized into one cell, the y dimension has been quantized into two cells and the trajectory direction has been quantized into four cells. FIG. 7c illustrates a $2 \times 1 \times 4$ cellular array. The x dimension has been quantized into two cells, the y dimension has been quantized into one cell and the trajectory direction has been quantized into four cells. It should be noted that the arrays of FIG. 7 can be viewed as a single array of four cellular planes of five overlapping cells each.

Preprocessor 20 maps the symbol to be recognized into the arrays of FIG. 7 using the spreading functions discussed earlier. It's also possible to map the character to be recognized into the arrays of FIG. 7 using different spreading functions for different cells.

As discussed earlier, the low resolution feature array is compared with a plurality of low resolution reference arrays from reference array group 50. The low resolution reference arrays contained in group 50 are obtained by performing, on one or more reference symbols, the same preprocessing that preprocessor 20 performs on a symbol to be recognized. When more than one reference symbol is used to create a reference array for a particular symbol, the reference array can be formed by averaging corresponding cell values of the arrays associated with each reference symbol.

Figure 8:
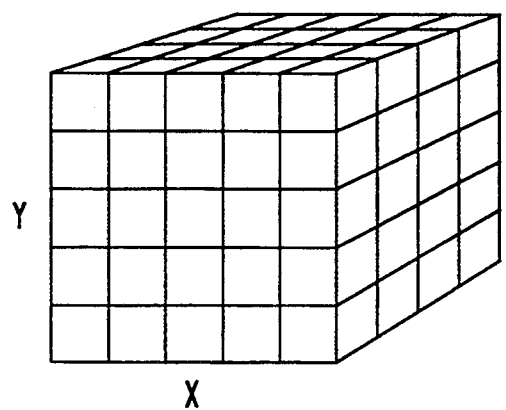
FIG. 8 illustrates a medium resolution cellular feature array.

FIG. 8 illustrates a medium resolution cellular feature array produced by preprocessor 22 and is in the form 5×5×4. The x and y dimensions contain five cells each and the trajectory direction contains four cells. It is also possible to use an array where cells in a particular dimension do not have to be regularly spaced.

Preprocessor 22 maps the symbol to be recognized into the array of FIG. 8 using the spreading functions discussed earlier. It's also possible to map the character to be recognized into the array of FIG. 8 using different spreading functions for different cells.

As discussed earlier, the medium resolution feature array is compared with a plurality of medium resolution reference arrays from reference array group 52. The medium resolution reference arrays contained in group 52 are obtained by perforating on one or more reference symbols, the same preprocessing that preprocessor 22 performs on a symbol to be recognized. When more than one reference symbol is used to create a reference array for a particular symbol, the reference array can be formed by averaging corresponding cell values of the arrays associated with each reference symbol.

Figure 9:
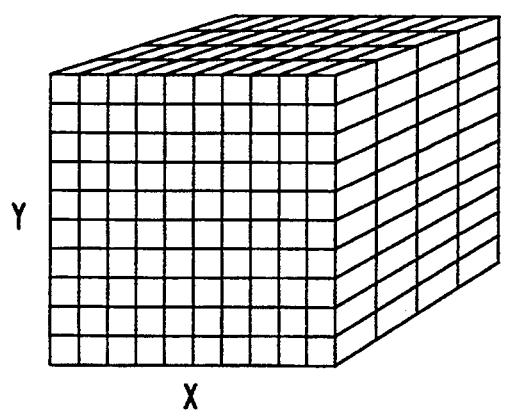
FIG. 9 illustrates a high resolution cellular feature array.

FIG. 9 illustrates a high resolution cellular feature array produced by preprocessor 24 and is in the form 10×10×4. The x and y dimensions contain ten cells each and the trajectory direction contains four cells. It is also possible to use an array where cells in a particular dimension do not have to be regularly spaced.

Preprocessor 24 maps the symbol to be recognized into the array of FIG. 9 using the spreading functions discussed earlier. It's also possible to map the character to be recognized into the array of FIG. 9 using different spreading functions for different cells.

As discussed earlier, the high resolution feature array is compared with a plurality of high resolution reference arrays from reference array group 54. The high resolution reference arrays contained in group 54 are obtained by performing, on one or more reference symbols, the same preprocessing that preprocessor 24 performs on a symbol to be recognized. When more than one reference symbol is used to create a reference array for a particular symbol, the reference array can be formed by averaging corresponding cell values of the arrays associated with each reference symbol.

Comparators 30, 32 and 34 compare cellular feature arrays produced by preprocessors 20, 22 and 24, respectively, with reference cellular arrays contained in groups 50, 52 and 54, respectively. The comparison is carded out by each of the comparators by determining the degree of similarity between the cellular feature array and the cellular reference arrays.

The comparators identify a subset of cellular reference arrays that are the most similar to the cellular feature array in question. The identification tags associated with the arrays composing the subset of feature arrays are forwarded to a selector. The selector provides a group of cellular reference arrays to the comparator that performs the next higher resolution comparison of a feature array and reference arrays.

In addition to identifying a subset using the current similarity measure between the feature array and reference array, it is possible to use the similarity measure that resulted from a prior comparison in the processing chain. This prior similarity measure can be passed to the next processing stage with the identification tags. For example, the prior similarity measure, which is associated with the lower resolution reference array corresponding to the same candidate symbol as the reference array now being examined, can be added to the similarity measure presently being calculated. In this way, similarity measures calculated at higher resolutions can contain a component resulting from lower resolution or global similarity measures.

There are many convenient ways of carrying out the comparison, for example the difference between the corresponding cell values of the feature array and reference array may be squared and summed to obtain a measure of similarity between the arrays. It is also possible to average the resulting sum by dividing the sum by the total number of cells in either the feature array or reference array.

It is possible to measure the similarities between feature arrays and reference arrays in a variety of ways. For example, weighted distances can be calculated using the following equation:

$$D = \sum_i \sum_j (f_i - r_i) R_{ij} (f_j - r_j)$$

where $f_i$ is the value of the $i^{th}$ cell in the feature array, $r_i$ is the value of the $i^{th}$ cell in the reference array, $R_{ij}$ are the coefficients of a symmetric positive semi-definite matrix, and where i and j run over the total number of cells composing the cellular arrays.

Other methods such as elastic matching techniques, Euclidian distances, the sum of the absolute values of the difference of corresponding cell values, likelihoods produced by statistical models such as Gaussian models whose mean vector is the reference array and whose covariance matrix can be estimated with multiple examples of each character or any other method for determining the similarity between arrays or vectors may be used to determine the similarity between a feature array and a reference array.

In some applications, the division between several input symbols is not clearly indicated in the input data and can result in something other than one symbol's worth of micro-segments entering preprocessors 20, 22 and 24 simultaneously. For example, this problem arises in applications involving cursive handwriting. This problem can be alleviated by preprocessing the input data before mapping the symbol into the feature cellular arrays. A series of symbols can be broken into individual symbols by using the length of a pen up signal from data collection device 10, the amount of pen displacement to the right, and/or the pen speed to identify the end of one symbol and the beginning of another symbol. Once the symbols are separated, they can be recognized as previously discussed. The symbols can be separated using preprocessor 170 included in input buffer 18. This preprocessor can be implemented using the same or similar hardware and/or software that was used to implement the other preprocessors, comparators and selectors.

It is also possible to reduce the number of low resolution reference arrays used in the comparison carried out by comparator 30. An initial examination of the features of the symbol to be identified can be used to eliminate some of the low resolution references provided to comparator 30. For example, it is wasteful to compare a feature array representing a symbol comprising five strokes with a reference array representing a reference symbol comprising two strokes. Features such as the number of strokes, the number of corners, the number of compound strokes, and the largest number of corners on a single stroke provide a basis for eliminating reference arrays. The number of strokes can be determined using a pen up/down signal from data collection device 10. A corner corresponds to a portion of a stroke that contains a change in trajectory direction, and a compound stroke refers to a stroke comprising at least one corner. These features are particularly useful when recognizing Chinese characters or symbols.

The initial examination of the symbol can be carried out by preprocessor 168 which controls the reference arrays provided to comparator 30. This preprocessor can be implemented using the same or similar hardware and/or software that was used to implement the other preprocessors, comparators and selectors.

We claim:

1. An apparatus for recognizing symbols, comprising:

first preprocessor means responsive to an applied plurality of micro-segments which describes a symbol, for associating a micro-segment with a first plurality of cells of a first feature cellular array, where each of said cells has a first associated feature label, and for assigning a cell value to a cell, using a micro-segment value that is related to how well a feature of said micro-segment associated with said cell corresponds to said cell's feature label;

means for selecting a subset of reference cellular arrays from a first plurality of reference cellular arrays based on a similarity between each of the subset reference cellular arrays and said first plurality of cells;

second preprocessor means for associating said micro-segment with a second plurality of cells of a second feature cellular array where each of said cells has a second associated feature label; and comparator means for recognizing said symbol based on a similarity between said second plurality of cells and a reference cellular array in a second plurality of reference cellular arrays identified by said subset of reference cellular arrays.

2. The apparatus of claim 1, further comprising means for delimiting said plurality of applied micro-segments from an incoming stream of micro-segments that define a plurality of symbols.

3. The apparatus of claim 1, further comprising means for decreasing a number of reference cellular arrays in said first plurality of reference cellular arrays based on an initial examination of said symbol's features.

4. The apparatus of claim 1, wherein said first plurality of cells comprise less cells than said second plurality of cells.

5. The apparatus of claim 1, wherein said first preprocessor means assigns said cell value using a sum of micro-segment values from a plurality of micro-segments associated with said cell.

6. The apparatus of claim 1, wherein said first preprocessor means assigns said cell value using said micro-segment value that is also related to a length of said micro-segment associated with said cell.

7. The apparatus of claim 1, wherein said first preprocessor means assigns said cell value based on a micro-segment associated with another cell.

8. An apparatus for recognizing symbols, comprising:

first preprocessor means responsive to an applied plurality of micro-segments which describes a symbol, for associating a micro-segment with a first plurality of cells of a first feature cellular array, where each of said cells has a first associated feature label;

means for selecting a subset of reference cellular arrays from a first plurality of reference cellular arrays based on a similarity between each of the subset reference cellular arrays and said first plurality of cells;

second preprocessor means for associating said micro-segment with a second plurality of cells of a second feature cellular array where each of said cells has a second associated feature label, and for assigning a cell value to a cell in said second plurality of cells, using a micro-segment value that is related to how well a feature of said micro-segment associated with said cell corresponds to said cell's feature label; and comparator means for recognizing said symbol based on a similarity between said second plurality of cells and a reference cellular array in a second plurality of reference cellular arrays identified by said subset of reference cellular arrays.

9. The apparatus of claim 8, further comprising means for delimiting said plurality of applied micro-segments from an incoming stream of micro-segments that define a plurality of symbols.

10. The apparatus of claim 8, further comprising means for decreasing a number of reference cellular arrays in said first plurality of reference cellular arrays based on an initial examination of said symbol's features.

11. The apparatus of claim 8, wherein said first plurality of cells comprise less cells than said second plurality of cells.

12. The apparatus of claim 8, wherein said second preprocessor means assigns said cell value using a sum of micro-segment values from a plurality of micro-segments associated with said cell.

13. The apparatus of claim 8, wherein said second preprocessor means assigns said cell value using said micro-segment value that is also related to a length of said micro-segment associated with said cell.

14. The apparatus of claim 8, wherein said second preprocessor means assigns said cell value based on a micro-segment associated with another cell.

15. An apparatus for recognizing symbols, comprising:

first preprocessor means responsive to an applied plurality of micro-segments which describes a symbol, for associating a micro-segment with a first plurality of cells of a first feature cellular array, where each of said cells has a first associated feature label, and for assigning a cell value to a cell in said first plurality of cells, using a first micro-segment value that is related to how well a feature of said micro-segment associated with said cell corresponds to said cell's feature label;

means for selecting a subset of reference cellular arrays from a first plurality of reference cellular arrays based on a similarity between each of the subset reference cellular arrays and said first plurality of cells;

second preprocessor means for associating said micro-segment with a second plurality of cells of a second feature cellular array where each of said cells has a second associated feature label, and for assigning a cell value to a cell in said second plurality of cells, using a second micro-segment value that is related to how well a feature of said micro-segment associated with said cell corresponds to said cell's feature label; and means for recognizing said symbol based on a similarity between said second plurality of cells and a reference cellular array in a second plurality of reference cellular arrays identified by said subset of reference cellular arrays.

16. The apparatus of claim 15, further comprising means for delimiting said plurality of applied micro-segments from an incoming stream of micro-segments that define a plurality of symbols.

17. The apparatus of claim 15, further comprising means for decreasing a number of reference cellular arrays in said first plurality of reference cellular arrays based on an initial examination of said symbol's features.

18. The apparatus of claim 15, wherein said first plurality of cells comprise less cells than said second plurality of cells.

19. The apparatus of claim 15, wherein said first and second preprocessor means assign said cell values using a sum of micro-segment values from a plurality of micro-segments associated with said cells.

20. The apparatus of claim 15, wherein said first and second preprocessor means assign said cell values using said micro-segment values that are also related to a length of said micro-segments associated with said cells.

21. The apparatus of claim 15, wherein said first and second preprocessor means assign said cell values based on a micro-segment associated with another cell.

* * * * *